United States Patent
Mao et al.

(10) Patent No.: US 9,092,615 B1
(45) Date of Patent: Jul. 28, 2015

(54) IDENTIFYING APPLICATION SOURCES ON NON-ROOTED DEVICES

(71) Applicants: Jun Mao, Culver City, CA (US); Abubakar Wawda, Cupertino, CA (US)

(72) Inventors: Jun Mao, Culver City, CA (US); Abubakar Wawda, Cupertino, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 72 days.

(21) Appl. No.: 13/752,026

(22) Filed: Jan. 28, 2013

(51) Int. Cl.
*G06F 11/00* (2006.01)
*G06F 21/51* (2013.01)

(52) U.S. Cl.
CPC .................................... *G06F 21/51* (2013.01)

(58) Field of Classification Search
CPC .............................. G06F 21/53; G06F 21/566
USPC ............................................................ 726/22
See application file for complete search history.

(56) References Cited

U.S. PATENT DOCUMENTS

| | | | | |
|---|---|---|---|---|
| 8,762,987 | B1 * | 6/2014 | Satish | 717/174 |
| 8,782,792 | B1 * | 7/2014 | Bodke | 726/24 |
| 8,978,139 | B1 * | 3/2015 | Banerjee et al. | 726/24 |
| 2004/0030914 | A1 * | 2/2004 | Kelley et al. | 713/200 |
| 2005/0044223 | A1 * | 2/2005 | Meyerson | 709/225 |
| 2005/0257266 | A1 * | 11/2005 | Cook et al. | 726/23 |
| 2006/0174334 | A1 * | 8/2006 | Perlin et al. | 726/9 |
| 2011/0113484 | A1 * | 5/2011 | Zeuthen | 726/19 |
| 2012/0110667 | A1 * | 5/2012 | Zubrilin et al. | 726/24 |
| 2013/0117855 | A1 * | 5/2013 | Kim et al. | 726/24 |
| 2013/0160126 | A1 * | 6/2013 | Kapoor et al. | 726/24 |
| 2013/0247177 | A1 * | 9/2013 | Park et al. | 726/21 |
| 2013/0247181 | A1 * | 9/2013 | Saraf et al. | 726/22 |

OTHER PUBLICATIONS

Rafal et al., "Monitoring high performance data streams in vertical markets: Theory and applications in public safety and healthcare", 2011, pp. 163-179.*
Juntunen et al., "HTML 5 in Mobile Devices—Drivers and Restraints", 2013, pp. 1053-1062.*

* cited by examiner

*Primary Examiner* — Yonas Bayou
(74) *Attorney, Agent, or Firm* — Lowenstein Sandler LLP (57) ABSTRACT

A method and apparatus for identifying an application source from which an application is installed on a non-rooted computing device. An application source identifier of a security application that does not have root access to an operating system monitors for an application installation. The application source identifier extracts a process identifier (PID) of the application being installed from a log message associated with the application installation and determines a package name from the PID. The PID identifies an application source from which the application is installed. The application source identifier receives, based on the package name, a confidence level for the application source from a security service over a network.

18 Claims, 4 Drawing Sheets

IDENTIFYING APPLICATION SOURCES ON NON-ROOTED DEVICES

TECHNICAL FIELD

Present embodiments relate to the field of processing data, and more particularly, to identifying application sources on non-rooted devices.

BACKGROUND

Rooting is the process of allowing users of devices, such as mobile devices like smartphones and tablets or other devices using mobile-type operating systems, to attain privileged control, also known as root access, within the subsystem. Non-rooted devices are devices that do not permit root access to third-party applications. Mobile devices can be infected with malicious software, also known as "malware." Malware, short for malicious or malevolent software, is used or created by attackers to disrupt computer operations, gather sensitive information or gain access to private computer systems. Malware may also refer to a variety of forms of hostile or intrusive software. Malware may include computer viruses, worms, trojan horses, spyware, adware, and other malicious programs. One way that malware is installed on mobile devices is by a user installing a mobile application (sometimes referred to just as "app") from an online software store, sometimes referred to as application marketplaces, application stores, or app stores. These application marketplaces are mobile software distribution platforms that deliver software without the use of physical media usually over online delivery mediums, such as the Internet, to requesting devices. There are various application marketplaces, such as, for example, App Store (iOS), Amazon Appstore, Mac App Store, Windows Store, Pokki Store, Google Play or the like.

Identifying the source (application marketplace) from where the mobile apps are downloaded may be helpful in detecting malware and privacy risks. Among other things, the identification of the source can help security providers prioritize crawling efforts and sample application marketplaces to determine reputations and confidences in these application marketplaces, since some application marketplaces are more likely to host malware than others. Mobile security products, such as mobile security products for the Android platform, submit information about applications (sometime referred to as telemetry) that are installed by users on their mobile devices. This telemetry includes, for each application, a field called "Installer," which is supposed to contain the application marketplace installer that installed the application. Android users sometimes use an application marketplace installer to install a new application. For example, users may use the Google play app to install apps from the official Google Marketplace, or the Amazon Appstore app to install apps from the Amazon Appstore. The "Installer" field that is submitted is based on a return value of the PackageManager-.getPackageInstaller( ) API. Unfortunately, in some cases this value is NULL. This is because the installer name is optionally set by the application marketplace and some application marketplaces do not set it. This deficiency may be particularly relevant on non-rooted devices since mobile security apps are typically run on non-rooted devices.

SUMMARY

A method and apparatus for identifying an application source from which an application is installed on a non-rooted computing device. An application source identifier of a security application that does not have root access to an operating system monitors for an application installation. The application source identifier extracts a process identifier (PID) of the application being installed from a log message associated with the application installation and determines a package name from the PID. The PID identifies an application source from which the application is installed. The processing logic receives, based on the package name, a confidence level for the application source from a security service over a network.

In one embodiment of a method, processing logic (e.g., hardware, software, firmware, or any combination thereof) monitors for an application installation of an application on a computing device by a security application executing on the computing device. The security application does not have root access to an operating system executing on the computing device. The processing logic extracts a process identifier (PID) of the application being installed from a log message associated with the application installation and determines a package name from the PID. The package name identifies an application source from which the application is installed.

In a further embodiment, the processing logic submits the package name to a security service over a network. The processing logic receives, based on the package name, a confidence level of the package name from the security service over the network and performs a security action based on the confidence level received from the security service. In one embodiment, the security action includes notifying a user of the computing device regarding the confidence level of the application installed on the computing device. In another embodiment, the security action includes providing a warning to a user when the confidence level is below a threshold and providing an option for the user to uninstall the application installed on the computing device.

In another embodiment, the PID identifies an application marketplace installer from which the application is installed. The processing logic converts the PID to the package name using information in a virtual file created by the operating system that maps the PID to the package name.

In another embodiment, the processing logic monitors for the application installation by subscribing a broadcast receiver component of the security application to an add-package broadcast intent. The add-package broadcast intent is broadcasted when a new application is installed. The processing logic receives, by the broadcast receiver component, the add-package broadcast intent when the application is installed. In a further embodiment, the processing logic scans one or more log messages from an activity manager component of the operating system to find the log message associated with the application installation. In this embodiment, the scanning is performed in response to receiving the add-package broadcast intent. The processing logic retrieves the PID from the log message associated with the application installation.

In addition, a computer readable storage medium for identifying an application source from which an application is installed on a non-rooted computing device is described. An exemplary computer readable storage medium provides instructions, which when executed by a processor causes the processor to perform operations such as the exemplary operations of the methods discussed above.

Further, systems and apparatus of a security application containing an application source identifier are described. An exemplary apparatus may include a memory and a processor coupled to the memory. The processor is configured to execute the application source identifier to perform various operations, such as those described above.

BRIEF DESCRIPTION OF THE DRAWINGS

The present embodiments will be understood more fully from the detailed description given below and from the accompanying drawings of various embodiments, which, however, should not be taken to limit the invention to the specific embodiments, but are for explanation and understanding only.

DETAILED DESCRIPTION

A method and apparatus for identifying an application source from which an application is installed on a non-rooted computing device. A component (e.g., a module or a plugin) referred to herein as an application source identifier of a security application that does not have root access to an operating system monitors an application installation. The application source identifier extracts a process identifier (PID) of the application being installed from a log message associated with the application installation and determines a package name from the PID. The PID identifies an application source from which the application is installed. The application source identifiers receives, based on the package name, a confidence level for the application source from a security service over a network. In the following description, numerous details are set forth. It will be apparent, however, to one of ordinary skill in the art having the benefit of this disclosure, that embodiments may be practiced without these specific details.

Figure 1:
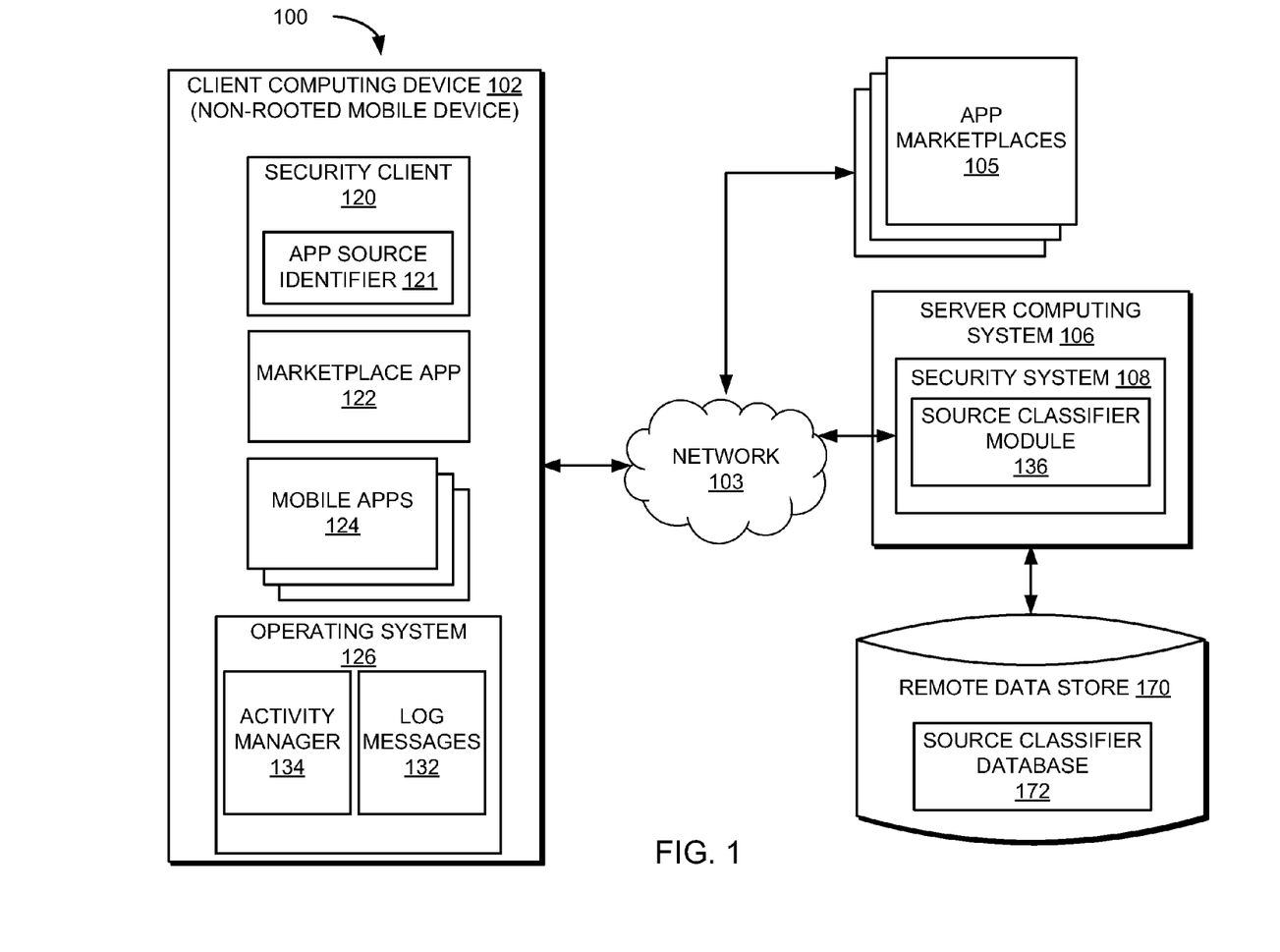
FIG. 1 is a block diagram of exemplary network architecture in which embodiments of an application source identifier may operate.

FIG. 1 is a block diagram of an exemplary network architecture 100 in which embodiments of an application source identifier 121 may operate. The network architecture 100 may include a client computing device 102, multiple application marketplaces 105 and a server computing system 106 coupled via a network 103 (e.g., public network such as the Internet or private network such as a local area network (LAN)). The client computing device 102 may include personal computers, laptops, PDAs, mobile phones, network appliances, etc. The client computing device 102 in some embodiments is a mobile device, such as a smartphone, a tablet, or other portable device. In one embodiment, the client computing device 102 is a non-rooted client device as described herein. The server computing system 106 may be a network appliance, a gateway, a personal computer, etc. The client computing device 102 and the server computing system 106 may reside on the same LAN, or on different LANs that may be coupled together via the Internet, but separated by firewalls, routers, and/or other network devices. In another embodiment, the computing systems may reside on different networks. The server computing systems 106 may host a security system 108, including, for example, a source classifier module 136. In one embodiment, the client computing device 102 and server computing systems 106 may be part of an organization, such as a corporate enterprise. Alternatively, the server computing system 106 and the computing device 102 may be part of different organizations.

The application marketplaces 105 are online stores for web applications, mobile applications, desktop applications or the like. The application marketplaces 105 may represent various different vendors of applications, such as those described herein. The application marketplaces 105 are digital distribution platforms that are intended to provide software to client computing device 102, as well as other client computing devices. It should also be noted that the application marketplaces 105 can deliver software to other devices than client devices, such as servers, gateways or the like.

The security system 108 may communicate with security clients 120. For example, the client computing device 102 may be a mobile device and the security client may be a mobile security application installed on the mobile device. Although the embodiments may be used in a security system using security clients 120, the embodiments may also be used in other security products. For example, as depicted in FIG. 1, the security system 108 may host the source classifier module 136 that is configured to track and maintain information regarding the application marketplaces 105, and applications provided by the application marketplaces 105. In another embodiment, the server computing system 106 hosts the security system 108 and an application source identifier. In this embodiment, the security client 120 can offload some or all of the application source identification functions to the server computing system 106. For example, a gateway can be used to perform the operations of the application source identifier 121. Also, the embodiments described herein may be used in other applications that can be used for identifying the source of the application(s) being installed without a security client.

The client computing device 102 includes an operating system 126 and various applications, including a security client 120, a marketplace application 122 and one or more applications 124 (mobile applications in the case of mobile devices). The security clients 120 include an application source identifier 121, which is configured to determine a source from which application(s) being installed on the client computing device 102. For example, the application source identifier 121 can be configured to identify from which application marketplace 105 the application originated. This can be used, for example, to provide additional security to the user of the client computing device 102. In one embodiment, the application source identifier 121 monitors for an application installation of an application on the client computing device 102. The security client 120 and the application source identifier 121 do not have root access to the operating system 126 of the client computing device 102. The application source identifier 121 extracts a process identifier (PID) of the application being installed from a log message associated with the application installation. The log messages 132 are stored in memory. In one embodiment, the log messages 132 are stored in a circular buffer or other type of buffer. A circular buffer is a data structure that uses a single, fixed size buffer as if it were connected end-to-end. An activity manager 134 interacts with activities running on the client computing device 102. The activity manager 134 can store one or more log messages 132 in the buffer when activities are performed on the device 102. In the case of an application installation, the activity manager 134 can store log message that contains a PID for the application installation. An example log message is provided below:

START {act=android.intent.action.
VIEW
dat=<path-to-apk>
type=application/vnd.android.package-archive
cmp=android/com.android.internal.app.ResolverActivity} from pid <pid>

These log messages 132 can be used by the application source identifier 121 to identify the one of the application marketplaces 105 from which the application is being installed. In one embodiment, the application source identifier 121 can extract the PID of the application being installed from one of the log messages 132 associated with the application installation. The application source identifier 121 determines a package name from the PID. The package name identifies an application source (e.g., the particular application marketplace 105) from which the application is installed. In one embodiment, the application source identifier 121 converts the PID to a package name by using information in a virtual file (e.g., /proc/<pid>/stat). At this point, the application source identifier 121 knows the marketplace app 122 was the application marketplace installer used to install the application. This may be used instead of the string returned from the PackageManager.getPackageInstaller( ) API, since this string value may be NULL in some instances.

When a source is identified, the security client 120 can use this information for security purposes. For example, the security client 120 can use this information to warn a user of a confidence level in the installed application, such as whether the installed application likely contains malware, for example. In another embodiment, the security client 120 can be used to uninstall an application that would violate a security policy. The security policy may identify application sources that are not permitted on the client computing device 102 and can initiate the uninstalling of the recently installed applications. There are other embodiments where the security client 120 can operate in a preventive fashion to interfere, stop or reverse the application installation. It should be noted that the application source may be one factor used in determining security. For example, the security client may also be looking at permissions that the application needs, what kind of application, what access the application needs, or the like, when determining whether the application poses security risks to the device.

The security system 108 may communicate with security clients 120 on the client computing devices 102 to perform operations to enforce a security policy as described herein. The source classifier module 136 can be used to identify installation packages to the corresponding application marketplaces 105, as well as classify confidence levels for the corresponding application marketplaces 105 or individual applications when data is already available. In one embodiment, the source classifier module 136 can store this information in a source classifier database 172. The source classifier database 172 can store information regarding the application marketplaces 105, the individual applications at those marketplaces, installation information on the client computing devices and the like. The source classifier database 172 may store other information about the applications being installed or the application sources from which these applications are installed. For example, the source classifier database 172 can store other information about the types of permissions that the applications need, application types, access privileges and access restrictions of these applications, and the like. Furthermore, the applications in questions may have been opened in an emulator to observe the behavior of the applications and these observations can be stored in the source classifier database 172. This information can be used in connection with the application source to determine a confidence level provided to the client when requested.

Although only one server computing system 106 is illustrated in FIG. 1, the security system 108 may be implemented as a security service hosted on one or more machines, including one or more server computers, client computers, gateways or other computing devices. The hosted service provider may also have multiple instances of the security system 108 on multiple networks that communicate with the service provider over a public or private network. In yet another configuration, the security system 108 service may reside on a single server, or on different servers, coupled to other devices via a public network (e.g., the Internet) or a private network (e.g., LAN). It should be noted that various other network configurations can be used including, for example, hosted configurations, distributed configurations, centralized configurations, etc.

The depicted client computing device 102, which may operate as an endpoint machine in an enterprise network that uses the security system 108 to enforce one or more security policies, includes a security client 120 that communicates with the security system 108. Embodiments of the security client 120, which includes the application source identifier 121, are described below with respect to FIGS. 2-3.

The client computing device 102 may also include a local data store (not illustrated), which can be one or more centralized data repositories that store the log messages, installation information, the applications 122, 124, or other information regarding the security policies and security actions to be performed by the security client 120. The local data store may be a single or multiple data structures (databases, repositories, files, etc.) residing on one or more mass storage devices, such as magnetic or optical storage based disks, tapes or hard drives. The local data store may be remote from the client computing device 102 and the client computing device 102 can communicate with the local data store 130 over a public or private network. The server computing system 106 also includes a remote data store 170 For example, in one embodiment, the server computing system 106 is communicatively coupled with a remote data store 170. The remote data store 170 may be one or more centralized data repositories that store the source classifier database 172 or other information regarding the application marketplaces 105 or applications 124. The remote data store 170 may also store information regarding security policies or other information associated with the security system 108. The remote data store 170 may be a single or multiple data structures (databases, repositories, files, etc.) residing on one or more mass storage devices, such as magnetic or optical storage based disks, tapes or hard drives. The remote data store 170 may be local to the server computing system 106 or may be remote from the server computing system 106, in which case, the server computing system 106 communicates with the remote data store 170 over a private or public network.

Figure 2:
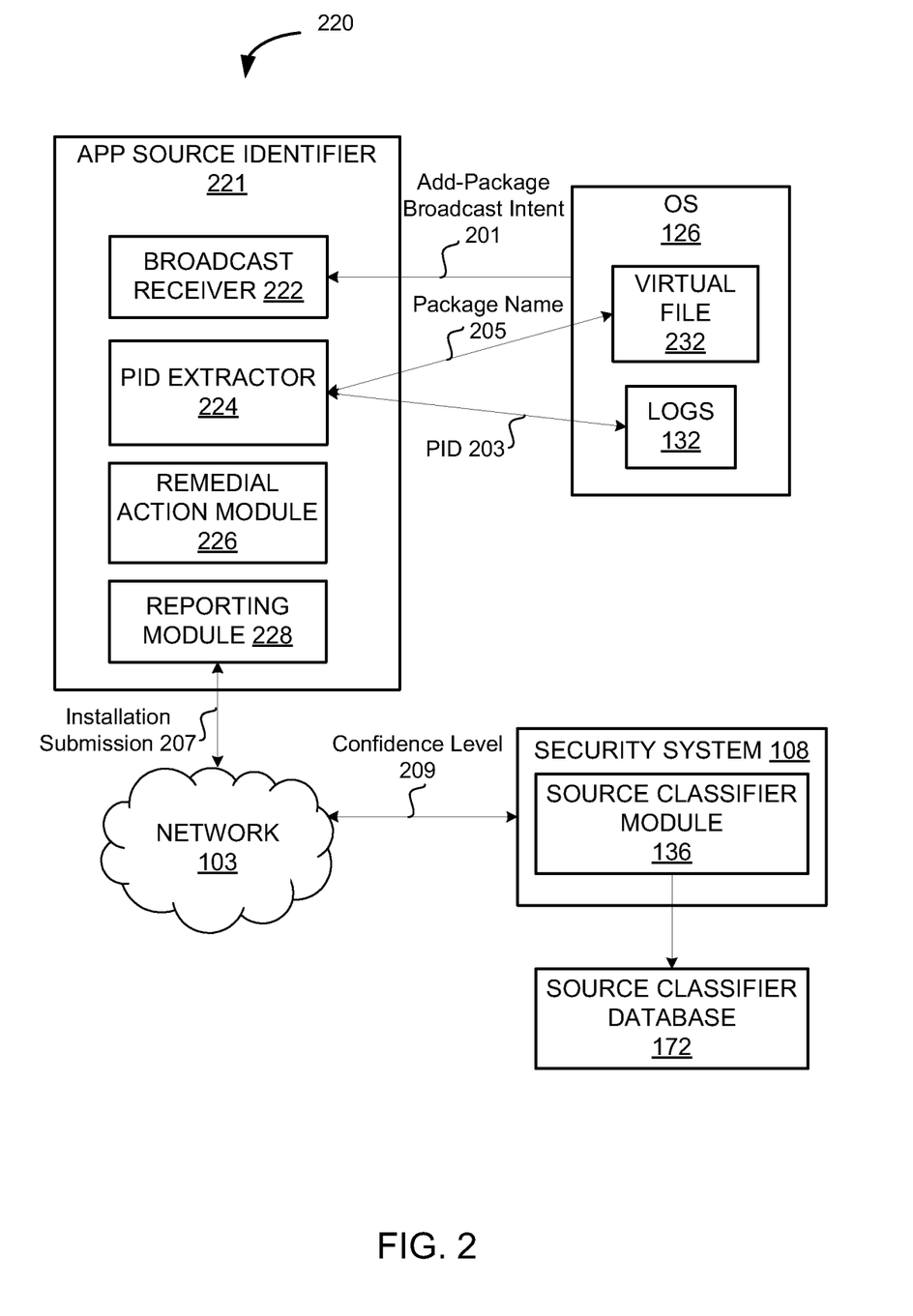
FIG. 2 is a block diagram of one embodiment of a security client, including an application source identifier to identify sources of applications installed on a device.

FIG. 2 is a block diagram of one embodiment of a security client 220, including an application source identifier 221 to identify sources of applications installed on a device. The application source identifier 221 is similar to the application source identifier 121, but specifically includes a broadcast receiver component 222, a PID extractor 224, a remedial action module 226 and a reporting module 228.

In one embodiment, the application source identifier 221 is configured to monitor application installations on the device. In one embodiment, the application source identifier 221 uses a broadcast receiver component 222. The broadcast receiver component 222 can be subscribed to an add-package broadcast intent 201 that is broadcast by the operating system 126 when a new application is installed. When the broadcast receiver component 222 receives the add-package broadcast intent 201, the PID extractor 224 scans one or more log messages 132 to find a log message associated with the application installation identified in the add-package broadcast intent 201. The log message may be a START message that indicates that the system has requested the install of the package. This log message may be stored in a system log, such as a circular log that stores messages for a certain amount of time or a certain number of messages (e.g., message count). As described herein, the monitoring of the log messages may not be done continuously, but rather in response to message that comes from the system that the package is being added. The PID extractor 224 retrieves the PID 203 from the found log message 132. The PID extractor 224 can also convert the PID 203 to a package name 205 using information contained in a virtual file 232 created by the operating system 126 (e.g., /proc/<pid>/stat). The virtual file 232 includes information that maps the PID 203 to the package name 205. The package name identifies an application source from which the application is installed. In another embodiment, the PID 203 may be an arbitrary number and the PID extractor 224 can extract the package name 205 using a public API that maps the PID 203 to the package name 205.

In a further embodiment, the reporting module 228 submits the package name 205, identified by the PID extractor 224, to a security service, such as the security system 108 over the network 103. For example, the reporting module 228 can generate and send an installation submission 207 that includes information about the application install, including the package name 205. The security system 108, using the source classifier module 136, may classify the package name 205 based on information stored in the source classifier database 172 when this is the first instance for the package name 205. The security system 108 can use this installation submission 207 to start building a reputation for the application source, the installed application, or both. When the package name 205 has already been classified, the security system 108 can return to the application source identifier 221 a confidence level 209 corresponding to the identified package name 205 or corresponding to the application source from which the application is installed. The confidence level 209 may be a percentage value, a value between 0 and 1, or other values to indicate the confidence level assigned to the installed application by the security system 108. The remedial action module 226 can perform a security action based on the returned confidence level 209 received from the security system 108. For example, the remedial action module 226 can notify a user of the device regarding the confidence level of the application installed on the device. The remedial action module 226 may also provide a warning to a user when the confidence level 209 of the installed application is below a threshold. The remedial action module 226 may also provide an option for the user to uninstall the installed application in connection with the warning. Alternatively, other security actions can be performed by the remedial action module 226 as specified by the security policies defined for the security client application or the security system 108.

In other embodiments, the security client 220 may include additional components to enforce security policies, defined by the security client 220 or the security system 108. Details of these components have not been included so as to not obscure the description of the present embodiments.

Figure 3:
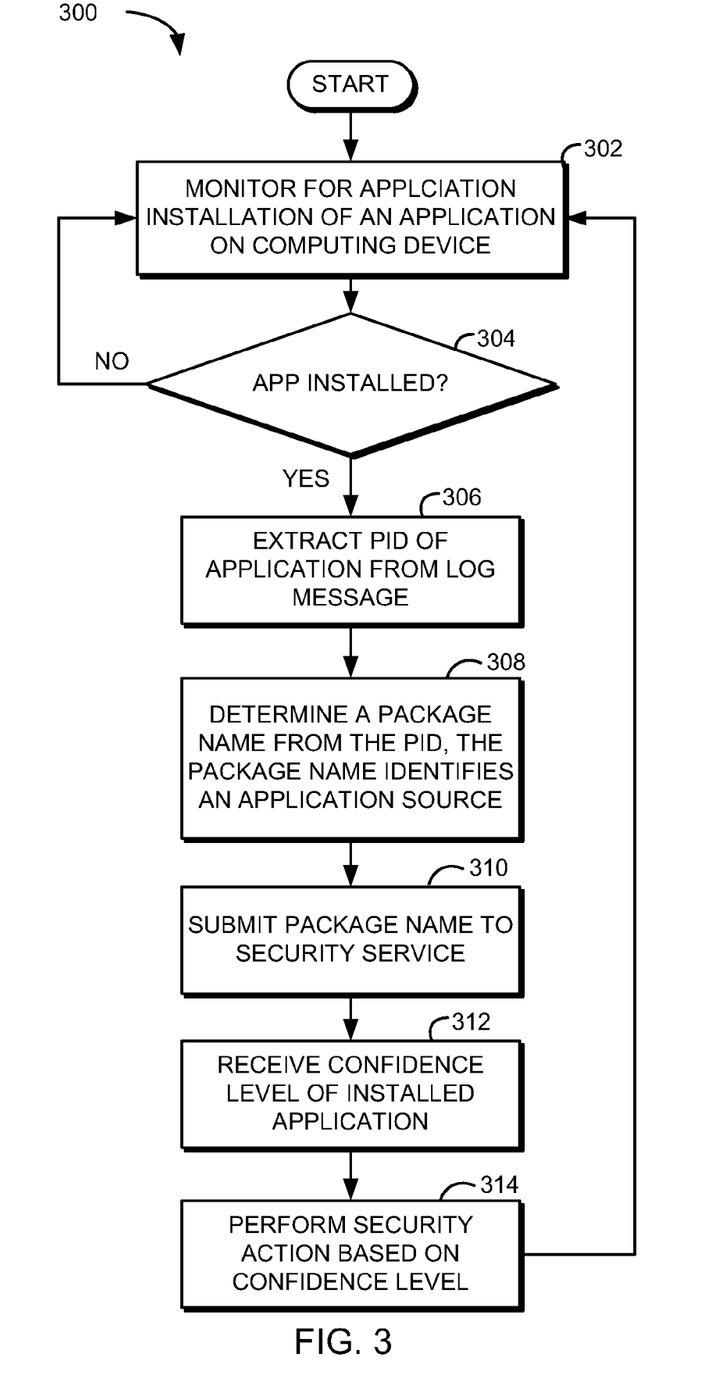
FIG. 3 is a flow diagram of one embodiment of a method of enforcing security policies based on identified sources of installed applications.

FIG. 3 is a flow diagram of one embodiment of a method 300 of enforcing security policies based on identified sources of installed applications. The method 300 is performed by processing logic that may comprise hardware (circuitry, dedicated logic, etc.), software (such as is run on a general purpose computing system or a dedicated machine), or a combination of both. In one embodiment, the client computing device 102 of FIG. 1 performs the method 300. In another embodiment, the security client 120 of FIG. 1 performs the method 300. In another embodiment, the application source identifier 121 of FIG. 1 or application source identifier 221 of FIG. 2 performs the method 300. Alternatively, other components of the client computing device 102 and server computing system 106 can be configured to perform some or all of the method 300.

Referring to FIG. 3, processing logic begins method 300 by processing logic monitoring for an application installation of an application on a computing device by a security application executing on the computing device (block 302). The security application does not have root access to an operating system executing on the computing device. The processing logic determines that an application installation is occurring or has occurred (block 304). If the application installation is not detected, the processing logic continues monitoring at block 302. When the processing logic determines that the application installation is detected at block 304, the processing logic extracts a process identifier (PID) of the application being installed from a log message associated with the application installation (block 306). The processing logic determines a package name from the PID (block 308). The package name identifies an application source from which the application is installed.

In a further embodiment, the application source that has been identified by the processing logic can be used for security purposes as depicted in further operations of FIG. 3. The method 300 continues at block 310 at which the processing logic submits the package name to a security service (block 310). This security service may be local, such as on the security client of the client device, or may be a remote, such as on the security system residing on a server computing system. In response to the submission, the processing logic receives a confidence level of the installed application (block 312), and the processing logic performs a security action based on the confidence level (block 314), and the method returns to block 302 to monitor for application installations. In one embodiment, the security service may perform a lookup in a source classifier database 172 to determine information about the identified application source, e.g., one of the application marketplaces 105. The security service may return the confidence level of the installed application to the security client 120 for performing the security operation. In one embodiment, the security action performed at block 314 includes notifying a user of the client computing device regarding the confidence level of the application installed on the client computing device. In another embodiment, the security action performed at block 314 includes providing a warning to a user when the confidence level is below a threshold and providing an option for the user to uninstall the installed application. This threshold can be programmable and can be set by the user or by an administrator of the security service. The option can be a button on a user interface, a link on the user interface, a dialog box with the warning, or the like.

In one embodiment, the processing logic monitors for the application installation at block 302 by subscribing a broadcast receiver component of the security application to an add-package broadcast intent. The add-package broadcast intent is broadcasted when a new application is installed. This may be broadcast by the operating system. The processing logic receives, by the broadcast receiver component, the add-package broadcast intent when the application is installed. For example, constantly monitoring log messages may be battery intensive and/or may slow operations on the device. The decrease in battery energy and performance may cause users to uninstall the security application, especially when the client device is a mobile device. However, by monitoring log messages in response to receiving the add-package broadcast intent, the processing logic can efficiently detect when the application is installed. Alternatively, other methods for detecting when a new application is installed may be used as a trigger point to determine the package name.

In a further embodiment, the processing logic extracts the PID at block 306 by scanning one or more log messages from an activity manager component of the operating system to find the log message associated with the application installation. The scanning is performed in response to receiving the add-package broadcast intent. The processing logic retrieves the PID from the found log message associated with the application installation.

In another embodiment, the PID identifies an application marketplace installer from which the application is installed. The processing logic converts the PID to the package name using information in a virtual file created by the operating system that maps the PID to the package name.

In other embodiments, the processing logic can perform other security operations using the identified application source. For example, the security policy can be used to prevent use of the application installed when the confidence level falls below the threshold. The security policy can also notify an administrator of the security system. There are even scenarios where the security policy can be used to notify a parent of the application installation on a child's device and the corresponding confidence level assigned to the installed application. This can be done to help protect the child's privacy or sensitive information on the child's device. Alternatively, the application source can be used for other security purposes and non-security purposes.

Figure 4:
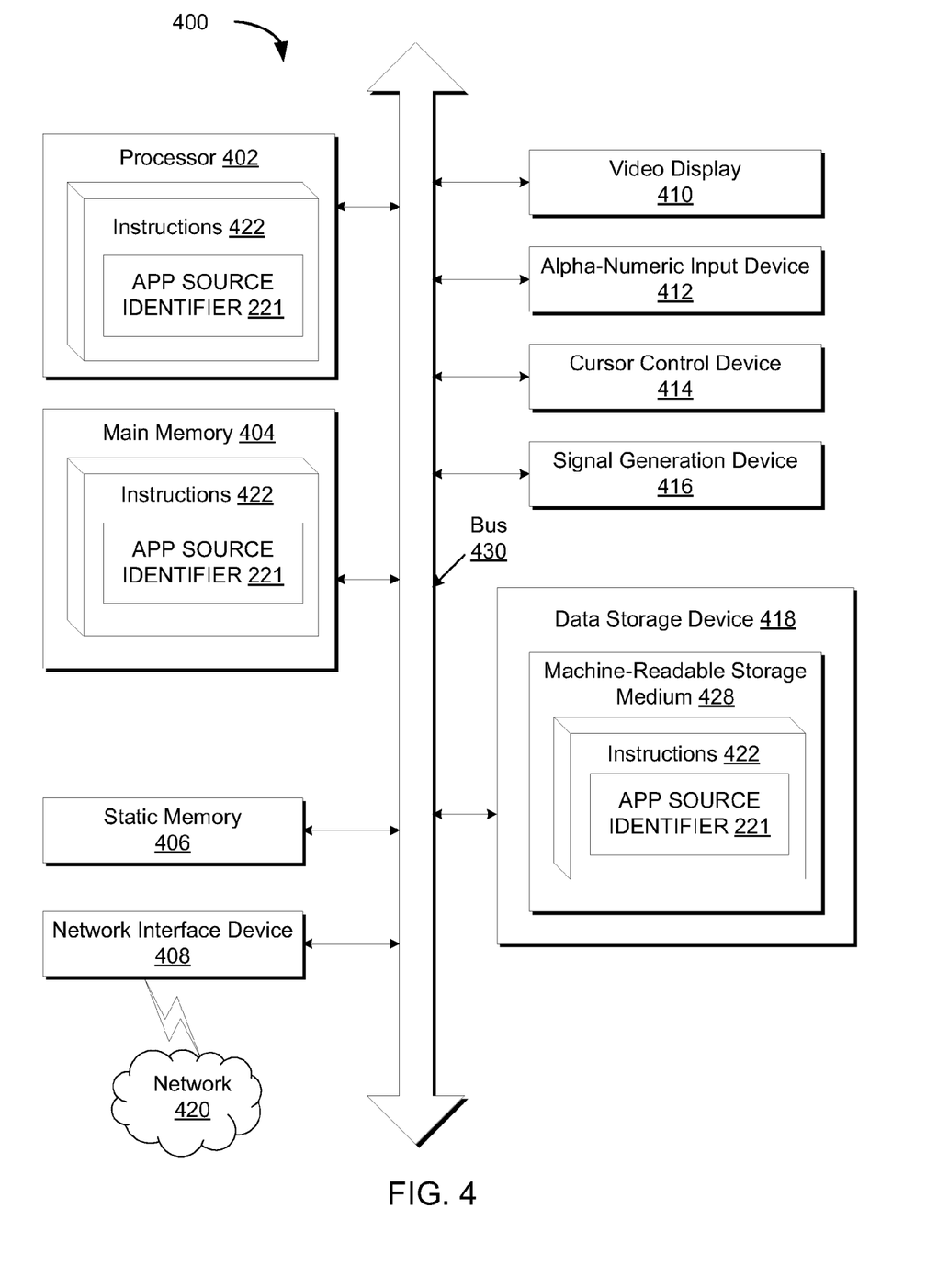
FIG. 4 illustrates a diagrammatic representation of a machine in the exemplary form of a computing device within which a set of instructions, for causing the machine to perform any one or more of the methodologies described herein, may be executed.

FIG. 4 illustrates a diagrammatic representation of a machine in the exemplary form of a computing system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions 422 to perform any one or more of the methodologies discussed herein, such as method 300 of FIG. 3.

The exemplary computing system 400 includes a processor 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute the processing logic for application source identifier 221 for performing the operations and steps discussed herein.

The computing system 400 may further include a network interface device 408. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-readable medium 428 on which is stored one or more sets of instructions (e.g., application source identifier 221) embodying any one or more of the methodologies or functions described herein. The application source identifier 221 may also reside, completely or at least partially, within the main memory 404 and/or within the processor 402 during execution thereof by the computing system 400, the main memory 404 and the processor 402 constituting computer-readable media. The application source identifier 221 may further be transmitted or received over a network 420 via the network interface device 408.

In one implementation, the instructions 422 include instructions for the application source identifier 221 of FIG. 2, including, for example, the broadcast receiver 222, PID extractor 224, remedial action module 226, and reporting module 226 and/or a software library containing methods that call modules in the application source identifier 221. While the computer-readable storage medium 428 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The application source identifier 221 may also be implemented in a module (not illustrated) as discrete hardware components or integrated in the functionality of hardware components such as ASICS, FPGAs, DSPs, or similar devices. The application source identifier module may implement operations of application source identifier as described herein with respect to FIG. 3. In addition, the application source identifier module can be implemented as firmware or functional circuitry within hardware devices. Further, the application source identifier module can be implemented in any combination hardware devices and software components.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
    monitoring for an application installation of an application on a computing device by a security application executing on the computing device, wherein the security application does not have root access to an operating system executing on the computing device;
    extracting a process identifier (PID) of the application being installed from a log message associated with the application installation;
    determining a package name from the PID, wherein the package name identifies an application store from which the application is installed;
    submitting the package name to a security service over a network;
    receiving, based on the package name, a confidence level for the application store from the security service over the network; and
    performing a security action based on the confidence level received from the security service.

2. The method of claim 1, wherein the performing the security action comprises notifying a user of the computing device regarding the confidence level of the application installed on the computing device.

3. The method of claim 2, wherein the performing the security action further comprises:
    providing a warning to the user when the confidence level is below a threshold; and
    providing an option for the user to uninstall the installed application.

4. The method of claim 1, wherein the PID identifies an application marketplace installer from which the application is installed, and wherein the determining the package name comprises converting the PID to the package name using information in a virtual file created by the operating system that maps the PID to the package name.

5. The method of claim 1, wherein the monitoring comprises:
    subscribing a broadcast receiver component of the security application to an add-package broadcast intent, wherein the add-package broadcast intent is broadcasted when a new application is installed; and
    receiving, by the broadcast receiver component, the add-package broadcast intent when the application is installed.

6. The method of claim 5, wherein the extracting the PID comprises:
    scanning one or more log messages from an activity manager component of the operating system to find the log message associated with the application installation, wherein the scanning is performed in response to receiving the add-package broadcast intent; and
    retrieving the PID from the found log message associated with the application installation.

7. A computing device comprising:
a memory; and
a processor coupled with the memory to execute a security application that does not have root access to an operating system executing on the processor, wherein the security application is to:
monitor for an application installation of an application on the computing device;
extract a process identifier (PID) of the application being installed from a log message associated with the application installation;
determine a package name from the PID, wherein the package name identifies an application store from which the application is installed;
submit the package name to a security service over a network;
receive, based on the package name, a confidence level of the package name from the security service over the network; and
perform a security action based on the confidence level received from the security service.

8. The computing device of claim 7, wherein the computing device is a mobile device and the security application is a mobile security application.

9. The computing device of claim 7, wherein the security application comprises an application store identifier comprising:
a broadcast receiver to subscribe an add-package broadcast intent when the application is installed; and
a PID extractor to scan one or more log messages from an activity manager component of the operating system to find the log message associated with the application installation and to retrieve the PID from the log message associated with the application installation, and wherein the PID extractor is further to convert the PID to the package name using information in a virtual file created by the operating system that maps the PID to the package name.

10. The computing device of claim 9, wherein the application store identifier further comprises:
a reporting module to submit the package name to the security service over the network and to receive the confidence level of the package name from the security service over the network; and
a remedial action module to perform the security action based on the confidence level received from the security service.

11. The computing device of claim 10, wherein the remedial action module is to notify a user of the computing device regarding the confidence level of the application installed on the computing device.

12. The computing device of claim 10, wherein the remedial action module is to provide a warning to a user when the confidence level is below a threshold and to provide an option for the user to uninstall the installed application.

13. A non-transitory computer readable storage medium including instructions that, when executed by a processor of a computing device, cause the processor to:
monitor for an application installation of an application on the computing device by a security application executing on the computing device, wherein the security application does not have root access to an operating system executing on the computing device;
extract a process identifier (PID) of the application being installed from a log message associated with the application installation;
determine a package name from the PID, wherein the package name identifies an application store from which the application is installed;
submit the package name to a security service over a network;
receive, based on the package name, a confidence level of the package name from the security service over the network; and
perform a security action based on the confidence level.

14. The non-transitory computer readable storage medium of claim 13, wherein the processor, for the security action, is further to notify a user of the computing device regarding the confidence level of the application installed on the computing device.

15. The non-transitory computer readable storage medium of claim 14, wherein the processor, for the security action, is further to:
provide a warning to the user when the confidence level is below a threshold; and
provide an option for the user to uninstall the installed application.

16. The non-transitory computer readable storage medium of claim 13, wherein the PID identifies an application marketplace installer from which the application is installed, and wherein the processor is further to determine the package name by converting the PID to the package name using information in a virtual file created by the operating system that maps the PID to the package name.

17. The non-transitory computer readable storage medium of claim 13, wherein the processor, to monitor for the application installation, if further to:
subscribe a broadcast receiver component of the security application to an add-package broadcast intent, wherein the add-package broadcast intent is broadcasted when a new application is installed; and
receive, by the broadcast receiver component, the add-package broadcast intent when the application is installed.

18. The non-transitory computer readable storage medium of claim 17, wherein the processor, to extract the PID is further to:
scan one or more log messages from an activity manager component of the operating system to find the log message associated with the application installation, wherein the scan is performed in response to receiving the add-package broadcast intent; and
retrieve the PID from the found log message associated with the application installation.

* * * * *